United States Patent
Suzuki

(10) Patent No.: US 12,230,034 B2
(45) Date of Patent: Feb. 18, 2025

(54) METHOD EXECUTED BY AN INFORMATION PROCESSING DEVICE FOR PERFORMING AN AUTHENTICATION OF COMMODITY PRODUCTS

(71) Applicant: FUJITSU LIMITED, Kawasaki (JP)

(72) Inventor: Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 17/873,460

(22) Filed: Jul. 26, 2022

(65) Prior Publication Data
US 2023/0034455 A1 Feb. 2, 2023

(30) Foreign Application Priority Data
Jul. 30, 2021 (JP) .................. 2021-126308

(51) Int. Cl.
*G06V 20/52* (2022.01)
*G06Q 30/018* (2023.01)
(Continued)

(52) U.S. Cl.
CPC .......... *G06V 20/53* (2022.01); *G06Q 30/018* (2013.01); *G06V 10/26* (2022.01);
(Continued)

(58) Field of Classification Search
CPC .......... G06K 9/00771; G06Q 10/0833; G06Q 10/087; G06Q 20/18; G06Q 20/20;
(Continued)

(56) References Cited

U.S. PATENT DOCUMENTS 8,448,858 B1 5/2013 Kundu et al.
10,387,896 B1 * 8/2019 Hershey ............... H04N 23/90
(Continued)

FOREIGN PATENT DOCUMENTS

JP 2013-41354 A 2/2013
JP 2020-61044 A 4/2020
(Continued)

OTHER PUBLICATIONS

Extended European Search Report issued Dec. 21, 2022, in corresponding European Patent Application No. 22187186.6, 8 pp.
Japanese Office Action issued Apr. 4, 2023, in corresponding Japanese Patent Application No. 2021-126308, 8pp.

*Primary Examiner* — Stephen R Burgdorf
(74) *Attorney, Agent, or Firm* — XSENSUS LLP

(57) ABSTRACT

A non-transitory computer-readable recording medium having stored therein an information processing program that causes a computer to execute a process including specifying, a first image area which includes a person who visits a store and a second image area which includes a container containing commodity products, specifying, positional relationship between each of a plurality of persons belonging to a first group and a specific machine placed in the store, identifying, from among the plurality of persons belonging to the first group, a first person who use the specific machine based on the positional relationship, specifying, a second person who carries the container in which the commodity products are contained from among the plurality of persons belonging to the first group, and performing authentication processing of the commodity products contained in the container carried by the second person has been completed.

17 Claims, 12 Drawing Sheets

(51) Int. Cl.
*G06V 10/26* (2022.01)
*G06V 10/77* (2022.01)
*G06V 20/70* (2022.01)
*G08B 13/196* (2006.01)

(52) U.S. Cl.
CPC .......... *G06V 10/7715* (2022.01); *G06V 20/70* (2022.01); *G08B 13/19691* (2013.01); *G08B 13/19697* (2013.01)

(58) Field of Classification Search
CPC .. G06Q 20/208; G06Q 20/206; G06Q 30/018; G06Q 30/02; G06Q 30/0201; G06Q 30/0208; G06Q 30/06; G06Q 30/0601; G06Q 30/0633; G06Q 30/0635; G06Q 30/0643; G06V 10/26; G06V 10/764; G06V 10/7715; G06V 20/52; G06V 20/53; G06V 20/70; G06V 40/23; G07G 1/0063; G07G 1/0081; G08B 13/19691; G08B 13/19697; G16Y 10/45
USPC ...................................................... 340/568.1
See application file for complete search history.

(56) References Cited

U.S. PATENT DOCUMENTS

| | | |
|---|---|---|
| 2012/0062749 A1* | 3/2012 | Kawahata ............ G06V 20/52 348/152 |
| 2016/0189277 A1 | 6/2016 | Davis |
| 2016/0260106 A1* | 9/2016 | Tonoike ............... G06V 40/173 |
| 2018/0232796 A1 | 8/2018 | Glaser et al. |
| 2019/0172039 A1 | 6/2019 | Kambara et al. |
| 2019/0333039 A1 | 10/2019 | Glaser et al. |
| 2020/0020112 A1 | 1/2020 | Buibas et al. |
| 2020/0134701 A1 | 4/2020 | Zucker et al. |
| 2020/0143172 A1* | 5/2020 | Zucker .................... G06V 20/52 |
| 2020/0383498 A1 | 12/2020 | Nodera |
| 2021/0124941 A1* | 4/2021 | Mirza .................... G06V 20/52 |
| 2022/0147963 A1 | 5/2022 | Nagano et al. |
| 2022/0383383 A1* | 12/2022 | Xiao .................. G06Q 20/3267 |

FOREIGN PATENT DOCUMENTS

| | | |
|---|---|---|
| JP | 2020-135422 A | 8/2020 |
| JP | 2020-197994 A | 12/2020 |

\* cited by examiner

FIG.5

| CHECKOUT COUNTER No. | COMMODITY PRODUCT NAME | NUMBER OF ITEMS | AMOUNT OF MONEY |
|---|---|---|---|
| 002 | ○○○○○ | 1 | 398 |
| | △△△△△ | 1 | 298 |
| | ××××× | 2 | 148 |
| | ... | ... | ... |

FIG.10

| CHECKOUT COUNTER No. 002 | NUMBER OF ITEMS 5 | TOTAL AMOUNT ¥992 |
|---|---|---|
| COMMODITY PRODUCT NAME | NUMBER OF ITEMS | AMOUNT OF MONEY |
| ○○○○○ | 1 | ¥398 |
| △△△△△ | 1 | ¥298 |
| ××××× | 2 | ¥148 |
| □□□□□ | 1 | ¥ 75 |

BASKET No. 012   AMOUNT OF MATERIALS Full 350   351   255

METHOD EXECUTED BY AN INFORMATION PROCESSING DEVICE FOR PERFORMING AN AUTHENTICATION OF COMMODITY PRODUCTS

CROSS-REFERENCE TO RELATED APPLICATION

This application is based upon and claims the benefit of priority of the prior Japanese Patent Application No. 2021-126308, filed on Jul. 30, 2021, the entire contents of which are incorporated herein by reference.

FIELD

The embodiments discussed herein are related to a computer-readable recording medium, an information processing method, and an information processing apparatus.

BACKGROUND

In retail stores, in order to prevent checkout counters from being crowded, introduction of a system in which customers scan and register commodity products and perform checkout themselves is being facilitated. Furthermore, in recent years, introduction of a system in which customers scan commodity products at places other than checkout counters, for example, at the places of sales floors where each of the commodity products is picked up into shopping baskets by the customers by using applications installed in terminals lent inside stores of the retail stores has been started. In such a system for customers to scan commodity products themselves, there is a need to detect a scan omission of a commodity product in order to detect a fraudulent behavior, such as shoplifting.

In contrast, as a system for detecting a fraudulent behavior of a customer at retail stores, a system for detecting a suspicious behavior or a fraudulent behavior, such as shoplifting, of a customer by using, for example, a monitoring camera placed in a store has been developed.

Patent Document 1: U.S. Pat. No. 8,448,858
Patent Document 2: U.S. Patent Application Publication No. 2016/0189277
Patent Document 3: Japanese Laid-open Patent Publication No. 2020-135422
Patent Document 4: Japanese Laid-open Patent Publication No. 2013-041354

SUMMARY

According to an aspect of an embodiment, a non-transitory computer-readable recording medium having stored therein an information processing program that causes a computer to execute a process including specifying, by analyzing a plurality of images taken by one or more camera devices, a first image area which includes a person who visits a store and a second image area which includes a container containing commodity products, specifying, by analyzing the plurality of images, positional relationship between each of a plurality of persons belonging to a first group and a specific machine placed in the store, identifying, from among the plurality of persons belonging to the first group, a first person who use the specific machine based on the positional relationship, specifying, by analyzing the plurality of images, a second person who carries the container in which the commodity products are contained from among the plurality of persons belonging to the first group, and when receiving an issued certificate related to the commodity products from the specific machine which the first person used, performing authentication processing of the commodity products contained in the container carried by the second person has been completed by using the issued certificate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data stored in bill payment information 33 according to the first embodiment;

FIG. 10 is a diagram illustrating an example of an alert notification according to the first embodiment;

DESCRIPTION OF EMBODIMENTS

However, in a system for customers to scan commodity products themselves, a commodity product scan need not always be performed at each of the sales floors of the commodity products, but may be performed at any location before calculation of a payment amount of commodity products to be purchased is performed by a bill payment terminal. Accordingly, it is conceivable that, at the time of payment performed by a bill payment terminal, for example, a store clerk visually specifies the commodity products contained in the shopping basket and determines whether a payment is appropriately made with respect to the specified commodity products. However, the shopping basket need not always be carried to an area in which the bill payment terminal is disposed at the time of the payment, and thus, the commodity products contained in the shopping basket are not able to be specified, so that it is conceivable that it is not able to or it is difficult to detect a scan omission of a commodity product.

Accordingly, it is an object in one aspect of an embodiment of the present invention to provide, in a system for customers to scan commodity products themselves, an information processing program, an information processing method, and an information processing apparatus capable of improving accuracy of detecting a scan omission of a commodity product.

Preferred embodiments of the present invention will be explained with reference to accompanying drawings. Furthermore, the present embodiment is not limited by the embodiments. In addition, each of the embodiments can be used in any appropriate combination as long as they do not conflict with each other.

First Embodiment

Figure 1:
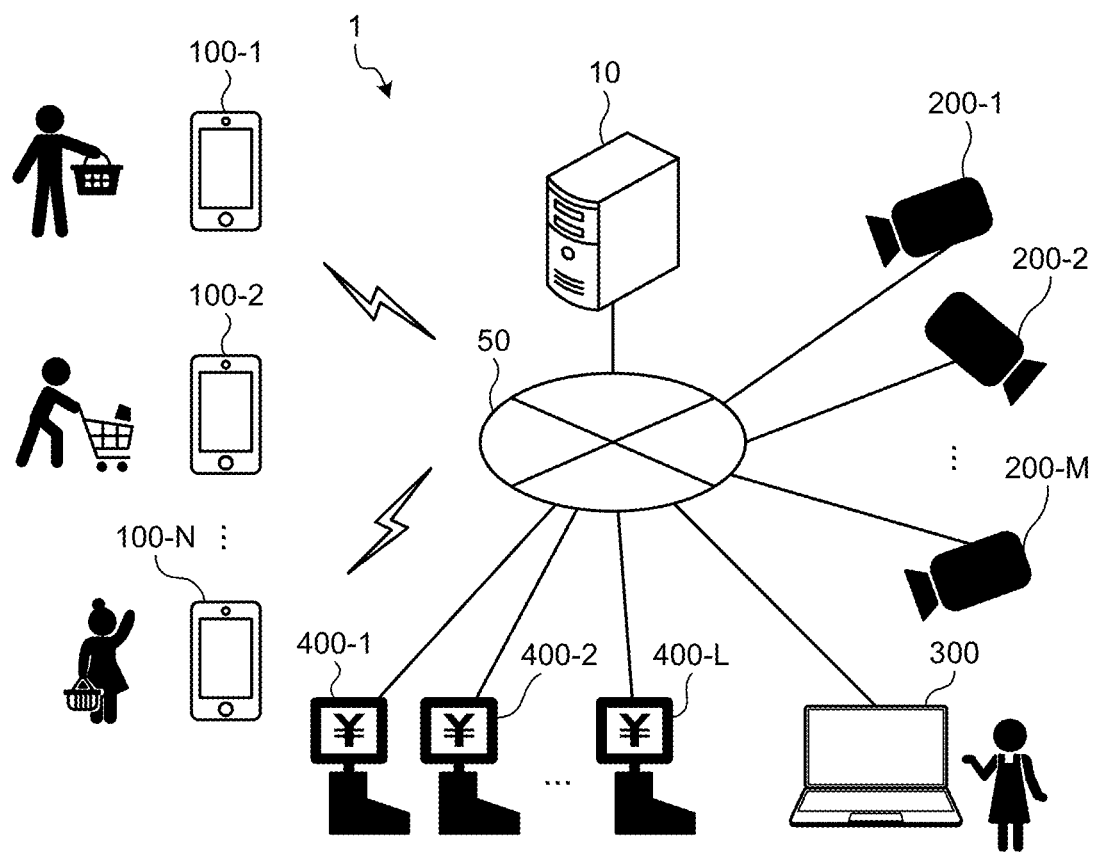
FIG. 1 is a diagram illustrating a configuration example of a fraud detection system according to a first embodiment.

First, a fraud detection system for implementing the present embodiment will be described. FIG. 1 is a diagram illustrating a configuration example of the fraud detection system according to the first embodiment. As illustrated in FIG. 1, a fraud detection system 1 is a system in which the fraud detection apparatus 10, and user terminals 100-1 to 100-N (N is any integer. Hereinafter, collectively referred to as a "user terminal 100") are connected via a network 50 so as to be communicated with each other.

Furthermore, the fraud detection apparatus 10 is also connected to camera devices 200-1 to 200-M (M is any integer. Hereinafter, collectively referred to as a "camera device 200") and a store clerk terminal 300 via the network 50 so as to be communicated with each other. In addition, the fraud detection apparatus 10 is also connected to bill payment terminals 400-1 to 400-L (L is any integer. Hereinafter, collectively referred to as a "bill payment terminal 400") via the network 50 so as to be communicated with each other.

Various kinds of communication network, such as an intranet, that is used inside of, for example, a store of a retail store may be used for the network 50 irrespective of a wired or wireless manner. Furthermore, instead of a single network, the network 50 may be constituted of, for example, an intranet and the Internet by way of a network device, such as a gateway, or another device (not illustrated). Furthermore, the inside of the store of the retail store is not limited to indoors, but may include outdoors within the site of the retail store.

The fraud detection apparatus 10 is an information processing apparatus, such as a desktop personal computer (PC), a notebook PC, or a server computer, that is installed, for example, inside the store of the retail store and that is used by store staff, an administrator, or the like.

The fraud detection apparatus 10 receives, from the camera device 200, a plurality of images obtained by capturing, by the camera device 200, a predetermined image capturing range, such as the inside of the store or the site of the retail store. Furthermore, the plurality of images mentioned here are, in a precise sense, video images captured by the camera device 200, that is, a series of frames of a moving image.

Furthermore, the fraud detection apparatus 10 specifies, from a captured image by using an existing object detecting technique, a customer who visits the store (hereinafter, sometimes simply referred to as a "person") or a shopping basket carried by the person (hereinafter, sometimes simply referred to as a "basket"). Furthermore, the fraud detection apparatus 10 specifies a group, such as a family, constituted from a plurality of persons on the basis of the relationship among the persons included in the captured image. Furthermore, the fraud detection apparatus 10 may generate, from the captured image by using an existing skeleton detection technique, skeleton information on the specified person, estimate a pose of the person, and specify a motion of the person putting a commodity product into the basket or the like.

Furthermore, on the basis of positional information on a person and positional information on each of the plurality of the bill payment terminals 400-1 to 400-L, the fraud detection apparatus 10 specifies the bill payment terminal 400 in which the person makes a payment. Furthermore, the fraud detection apparatus 10 specifies a person who pays a bill of commodity products by using the specified bill payment terminal 400 as a first person who makes a payment of commodity products from among the plurality of persons who belong to a group. Furthermore, the fraud detection apparatus 10 specifies a person who carries a basket as a second person who carries the basket from among the plurality of persons belonging to the group to which the first person who makes the payment of the commodity product belongs. As a result, the basket that is used by the group and the commodity products that are contained in the basket are associated with the bill payment terminal 400 or bill payment information that has been input to the bill payment terminal 400.

Then, the fraud detection apparatus 10 determines whether or not an unpaid commodity product is present on the basis of a difference between the number of commodity products contained in the basket and the number of commodity products that are input to the bill payment terminal 400. If an unpaid commodity product is present, the fraud detection apparatus 10 notifies the store clerk terminal 300 of an alert.

Furthermore, FIG. 1 illustrates the fraud detection apparatus 10 as a single computer; however, the fraud detection apparatus 10 may be a distributed computing system constituted by a plurality of computers. Furthermore, the fraud detection apparatus 10 may be a cloud computer device managed by a service provider that provides a cloud computing service.

The user terminal 100 is an information processing terminal that is used by each of the customers to scan a barcode of each of the commodity products by themselves in order to purchase the commodity products and register the purchased commodity products. The user terminal 100 may be a mobile terminal, such as a smartphone or a tablet personal computer (PC), owned by the customer, or a dedicated terminal that is lent inside the store. The user terminal 100 has, installed therein in advance, an application for, for example, scanning and registering commodity products.

The camera devices 200 are monitoring cameras installed, for example, the inside of the store or the site of the retail store. Furthermore, FIG. 1 illustrates a plurality of the camera devices 200; however, for example, it may be possible to use a single piece of the camera device 200 that captures an image of a site in the vicinity of a self-service checkout counter area in which the bill payment terminal 400 is installed. A video image captured by the camera device 200 is transmitted to the fraud detection apparatus 10.

The store clerk terminal 300 may be a mobile terminal, such as a smartphone or a tablet PC, carried by a store clerk of the retail store, or may be an information processing apparatus, such as a desktop PC or a notebook PC, installed at a predetermined position disposed inside the store. The store clerk terminal 300 receives an alert from the fraud detection apparatus 10 in the case where a fraudulent behavior, such as a scan omission of a commodity product, performed by a customer is detected by the fraud detection apparatus 10. Furthermore, a plurality of the store clerk terminal 300 may be present for, for example, each of the store clerks of the store, but the terminal that receives a notification of the alert may be limited to the terminal that is carried by, for example, a store clerk responsible for security positioned in the vicinity of the self-service checkout counter area.

The bill payment terminal 400 is a self-service checkout terminal that is used for a customer to pay a bill of the commodity products by himself or herself. The bill payment terminal 400 receives information on the commodity products to be purchased that have been registered via the user terminal 100. Then, the bill payment terminal 400 receives the payment of the cost of the commodity products to be purchased from the customer by cash, a credit card, electronic money, or the like.

Figure 2:
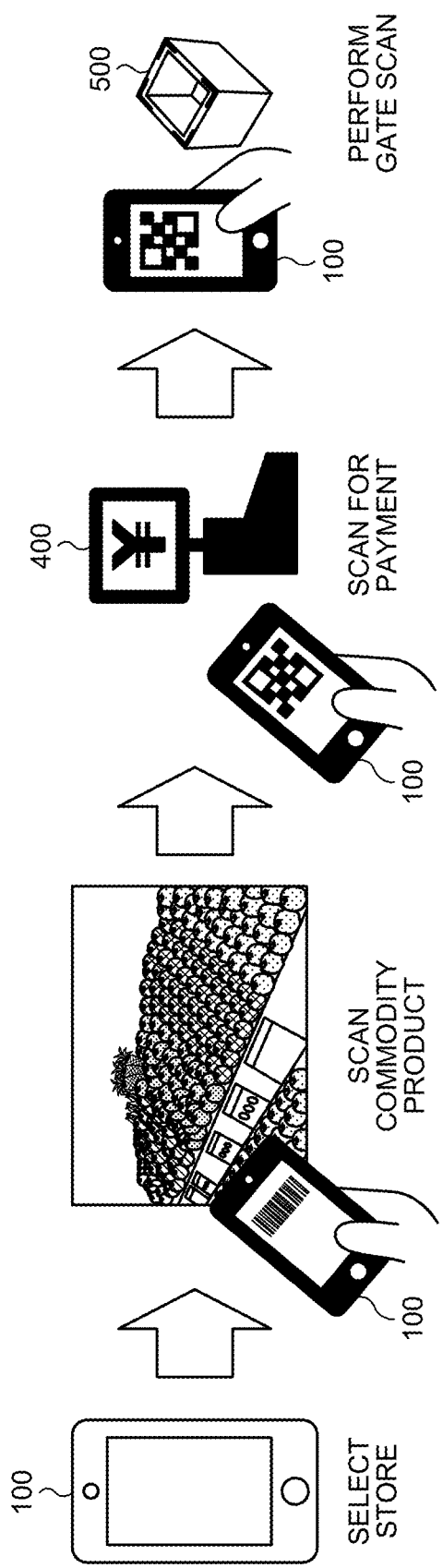
FIG. 2 is a diagram illustrating an example of purchase of commodity products made by performing self-scanning according to the first embodiment.

In the following, a method in which a customer purchases commodity products by scanning and registering commodity products by himself or herself (hereinafter, sometimes referred to as "self-scanning") will be described with reference to FIG. 2. FIG. 2 is a diagram illustrating an example of a purchase of commodity products made by performing self-scanning according to the first embodiment. As illustrated in FIG. 2, first, a customer selects a visited store through an application displayed on the user terminal 100. Then, the customer picks up the commodity products to be purchased and reads, for example, a barcode of each of the commodity products, a barcode attached to a commodity product shelf for each of the commodity products, or the like by using the user terminal 100 (hereinafter, sometimes referred to as a "commodity product scan"). As a result, the commodity products to be purchased are registered in the application.

Then, the customer scans a payment code displayed on a display unit of, for example, the bill payment terminal 400 by using the user terminal 100. Then, by making a payment of an amount displayed on a payment amount screen of the bill payment terminal 400, the purchase of the commodity products has been completed. Furthermore, the customer is able to exit the store by causing a gate reader 500 or the like installed at the exit of the store or the like to read a payment completion code displayed on the user terminal 100. Furthermore, although not illustrated in FIG. 1, the gate reader 500 is a code reader connected to the fraud detection apparatus 10 via the network 50 so as to be able to communicate with each other.

In the above, a purchase of commodity products by performing self-scanning has been described with reference to FIG. 2. However, in self-scanning, for example, a customer is able to put the commodity products into a basket without performing a commodity product scan and is able to avoid a payment without passing through a self-service checkout counter. Alternatively, by scanning only some of commodity products to be purchased and paying the bill of only the scanned commodity products at the self-service checkout counter, a customer is consequently able to avoid a payment of some of the commodity products. In particular, a fraudulent behavior is likely to be easily found by a store clerk in the case where the number of items of the commodity products is small; however, for example, it is difficult to find a fraudulent behavior by a store clerk or the like in the case where the number of items of the commodity products is large and some of the commodity products are not scanned.

Figure 3:
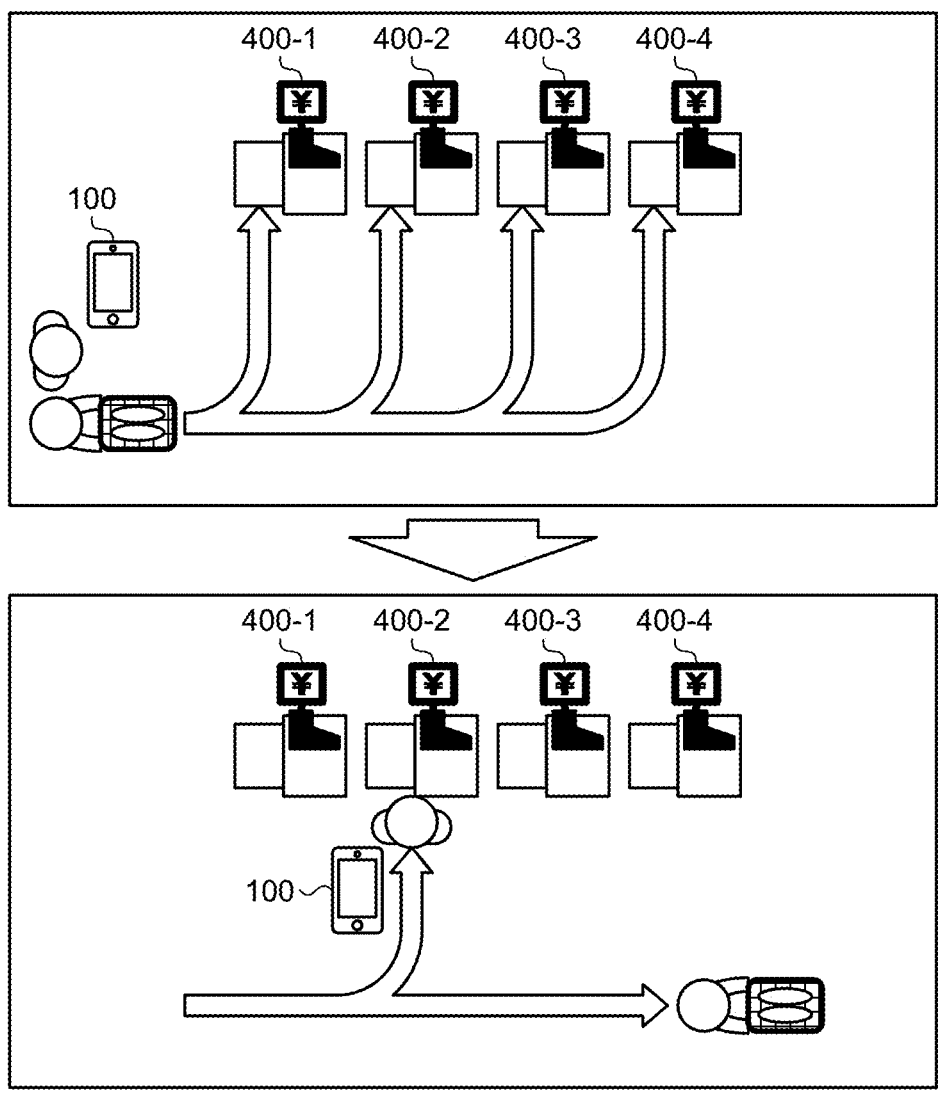
FIG. 3 is a diagram illustrating an example of a payment made at a self-service checkout counter according to the first embodiment.

In particular, a shopping basket need not always be carried to the area in which the bill payment terminal 400 is disposed at the time of payment, so that, in a case of, for example, a group customer as illustrated in FIG. 3, it is not able to specify the commodity products contained in the shopping basket and it is thus difficult to detect a scan omission of a commodity product.

FIG. 3 is a diagram illustrating an example of a payment made at a self-service checkout counter according to the first embodiment. As illustrated in FIG. 3, in a case of a group customer, there may be a case in which a person who makes a payment at the bill payment terminal 400 and a person who carries a basket are different. In this case, the person who carries the basket exhibits a behavior, such as a motion of putting the commodity products into a bag, at a position away from the bill payment terminal 400 during a period of time for which a person who makes a payment is paying a bill.

At this time, for example, it is possible to transmit information on the commodity products that are in the course of a payment process performed by the bill payment terminal 400 to the store clerk terminal 300 that is checked by a store clerk who monitors the self-service checkout counter area. However, it is not able to specify, only by the information, whether the commodity product that is in the course of a payment process is which commodity product contained in the shopping basket, so that it is not easy to detect a fraudulent behavior, such as a scan omission of a commodity product.

Functional Configuration of the Fraud Detection Apparatus 10

Figure 4:
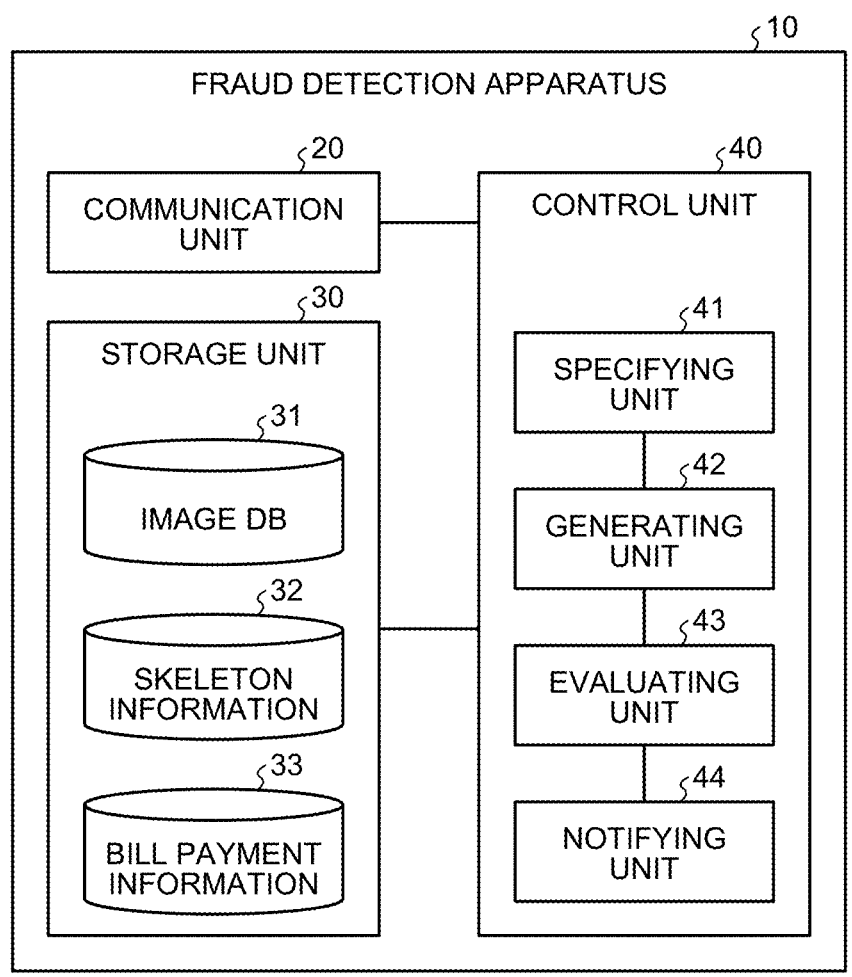
FIG. 4 is a diagram illustrating a configuration example of a fraud detection apparatus 10 according to the first embodiment.

In the following, a functional configuration of the fraud detection apparatus 10 will be described. FIG. 4 is a diagram illustrating a configuration example of the fraud detection apparatus 10 according to the first embodiment. As illustrated in FIG. 4, the fraud detection apparatus 10 includes a communication unit 20, a storage unit 30, and a control unit 40.

The communication unit 20 is a processing unit that controls communication with another device, such as the user terminal 100 or the camera device 200, and is, for example, a communication interface, such as a universal serial bus (USB) interface or a network interface card.

The storage unit 30 has a function for storing various kinds of data and a program executed by the control unit 40 and is implemented by, for example, a storage device, such as a memory or a hard disk. The storage unit 30 stores therein an image DB 31, skeleton information 32, the bill payment information 33, and the like.

The image DB 31 stores therein a plurality of captured images that are a series of frames captured by the camera device 200. Furthermore, the image DB 31 is able to store therein positional information on a person or an object that is included in the image and that is specified with respect to the subject captured image.

The skeleton information 32 stores therein skeleton information on the person specified from the captured image that is captured by the camera device 200. A process of generating the skeleton information will be described later. Furthermore, the process to be performed on the person specified from the captured image is performed by processing the skeleton information having a smaller amount of information, instead of directly processing the captured image, so that it is possible to reduce a processing load applied to the fraud detection apparatus 10. However, if the fraud detection apparatus 10 does not use the skeleton information, the fraud detection apparatus 10 need not generate and store the skeleton information 32 and the data thereon need not be included in the configuration of the fraud detection apparatus 10.

The bill payment information 33 stores therein information related to a payment of commodity products purchased by performing self-scanning. FIG. 5 is a diagram illustrating data stored in the bill payment information 33 according to the first embodiment. As illustrated in FIG. 5, the bill payment information 33 stores therein categories, such as "checkout counter No." that is an identifier for uniquely identifying the bill payment terminal 400 in which a payment process has been performed, "commodity product name" indicating the name of each of the commodity products that have been paid, "number of items" indicating the number of items for each commodity product, "amount of money" indicating a price of the associated commodity product, and the like. In addition, in the example illustrated in FIG. 5, only a piece of bill payment information is indicated; however, of course, a plurality of pieces of bill payment information are stored in the bill payment information 33. Accordingly, the bill payment information 33 may also store therein the date and time at which a payment is made. In addition, the bill payment information 33 is able to further store therein an identifier that uniquely indicates each of associated persons, baskets, and groups and is able to store therein each of the association relationships. In addition, it is possible to store, in the bill payment information 33, for example, an identifier for an image in which a person or a basket is captured and associate the image with the captured images that are stored in the image DB 31.

Furthermore, the above described information stored in the storage unit 30 is only an example and the storage unit 30 is able to store therein various kinds of information other than the above described information.

The control unit 40 is a processing unit that manages the entirety of the fraud detection apparatus 10 and is, for example, a processor. The control unit 40 includes a specifying unit 41, a generating unit 42, an evaluating unit 43, and a notifying unit 44. Moreover, each of the processing units is an example of an electronic circuit included by the processor or an example of a process executed by the processor.

The specifying unit 41 specifies, from the captured image captured by the camera device 200, a person who visits a store and an object that is used by the person. The object may include, for example, a basket, a commodity product, the user terminal 100, or the bill payment terminal 400. Moreover, a process of specifying the person may include a process of tracking, from the captured images that are captured at different time, the same person at different time on the basis of the appearance and an amount of movement of the person. Furthermore, the specifying unit 41 specifies a group, such as a family, constituted from a plurality of persons on the basis of the relationship among the persons included in the captured image.

Furthermore, the specifying unit 41 specifies the bill payment terminal 400 in which a person pays a bill from among the plurality of the bill payment terminals 400. This process is performed on the basis of, for example, the positional information on the person included in the captured image that has been captured by the camera device 200 and the positional information on each of the plurality of bill payment terminals.

Furthermore, the specifying unit 41 specifies, from the captured image that has been captured by the camera device 200, a group constituted of a plurality of persons who visit the store and a basket that is used by the group. Furthermore, the specifying unit 41 specifies the bill payment terminal 400 in which the first person who belongs to the group pays a bill from among the plurality of the bill payment terminals 400. Then, the specifying unit 41 associates the commodity products contained in the basket carried by the second person who belongs to the same group as the first person with a first bill payment terminal in which the first person pays a bill or bill payment information that is input to the first bill payment terminal. Moreover, a process of specifying the group may include a process of specifying a group on the basis of a position and a movement vector of each of bounding boxes of the respective plurality of persons included in, for example, the captured image.

Furthermore, a process of specifying the basket from the captured image may include a process of specifying the basket on the basis of an association relationship obtained from the coordinates on the captured images captured by, for example, the camera device 200-1 that captures an image of a site in the vicinity of the self-service checkout counter area and the camera device 200-2 that is used to capture an image of a basket from a position above the person's head. More specifically, for example, if a person enters a coordinate region that is included in the captured image captured by the camera device 200-1 and that indicates an image capturing range of the camera device 200-2, the basket may be specified by controlling the camera device 200-2 so as to capture an image of the basket from a position above the person's head. As a result, the camera device 200 is able to clearly capture an image of the basket at the time at which, for example, a person enters the self-service checkout counter area in order to pay a bill.

Furthermore, on the basis of, for example, the specified object and the skeleton information on the person generated by the generating unit 42, the specifying unit 41 may detect and specify a predetermined motion, such as a motion of a person registering a commodity product to be purchased to the user terminal 100. As a result, the fraud detection apparatus 10 is able to limit the person corresponding to a processing target for fraud detection only to the target person for self-scanning who uses the user terminal 100.

The generating unit 42 generates, from the captured image that has been captured by the camera device 200, the skeleton information on the person specified by the specifying unit 41. Moreover, in the case where the fraud detection apparatus 10 does not use the skeleton information, the generating unit 42 need not be included in the configuration of the fraud detection apparatus 10.

The evaluating unit 43 determines whether or not an unpaid commodity product is present on the basis of a difference between the number of first commodity products that are contained in a basket and the number of second commodity products that have been input to the bill payment terminal 400. The process of determining whether or not an unpaid commodity product is present may include a process of, for example, cutting out the image of the basket from the captured image as a partial image, estimating the amount of materials of the first commodity products from the partial image, and determining whether or not an unpaid commodity product is present on the basis of the amount of materials and the number of second commodity products. Moreover, if the person uses a plurality of baskets, the evaluating unit 43 determines whether or not an unpaid commodity product is present assuming that the commodity products contained in the plurality of baskets are collectively regarded as the number of the first commodity products or the amount of materials.

Moreover, the number of items may be counted by detecting the commodity products using an object detection technology, such as You Only Look Once (YOLO), as estimation of the amount of materials of the commodity products contained in the basket, or may be categorized into classifications that indicate the amount of materials in stages using, for example, Full, Mid, Low, or the like. Furthermore, the amount of materials of the commodity products may be estimated by inputting the partial image of the basket to a machine training model that is generated by performing machine training by using, for example, the image of the basket as a feature amount and the amount of materials of the commodity products contained in the basket as a correct answer label. Moreover, for the machine training, an image classifier, such as residual network (ResNet), may be used.

Furthermore, the evaluating unit 43 may receive, from the bill payment terminal 400, the bill payment information on the second commodity products that have been input to the bill payment terminal 400 and determine whether or not an unpaid commodity product is present on the basis of a difference between the number of the first commodity products that are contained in the basket and the number of paid items of the second commodity products based on the bill payment information. Moreover, the received bill payment information may be the bill payment information on the second commodity products registered via the user terminal 100 that is used to register, by the customer by himself or herself, the commodity products to be purchased.

The notifying unit 44 sends a notification of an alert on the basis of an evaluation result obtained by the evaluating unit 43 when an unpaid commodity product is present. A process of sending a notification of the alert may include a process of notifying the store clerk terminal 300 of, for example, a partial image of a basket or the commodity products contained in the basket included in the captured image and the bill payment information on the commodity products that have been input to the bill payment terminal 400. Moreover, the notifying unit 44 may notify the store clerk terminal 300 of the partial image of the basket or the commodity products contained in the basket and the bill payment information on the commodity products regardless whether or not an unpaid commodity product is present. As a result, the store clerk is able to detect a scan omission of a commodity product by visually comparing the commodity products contained in the basket to the paid commodity products.

Details of Functions

Figure 6:
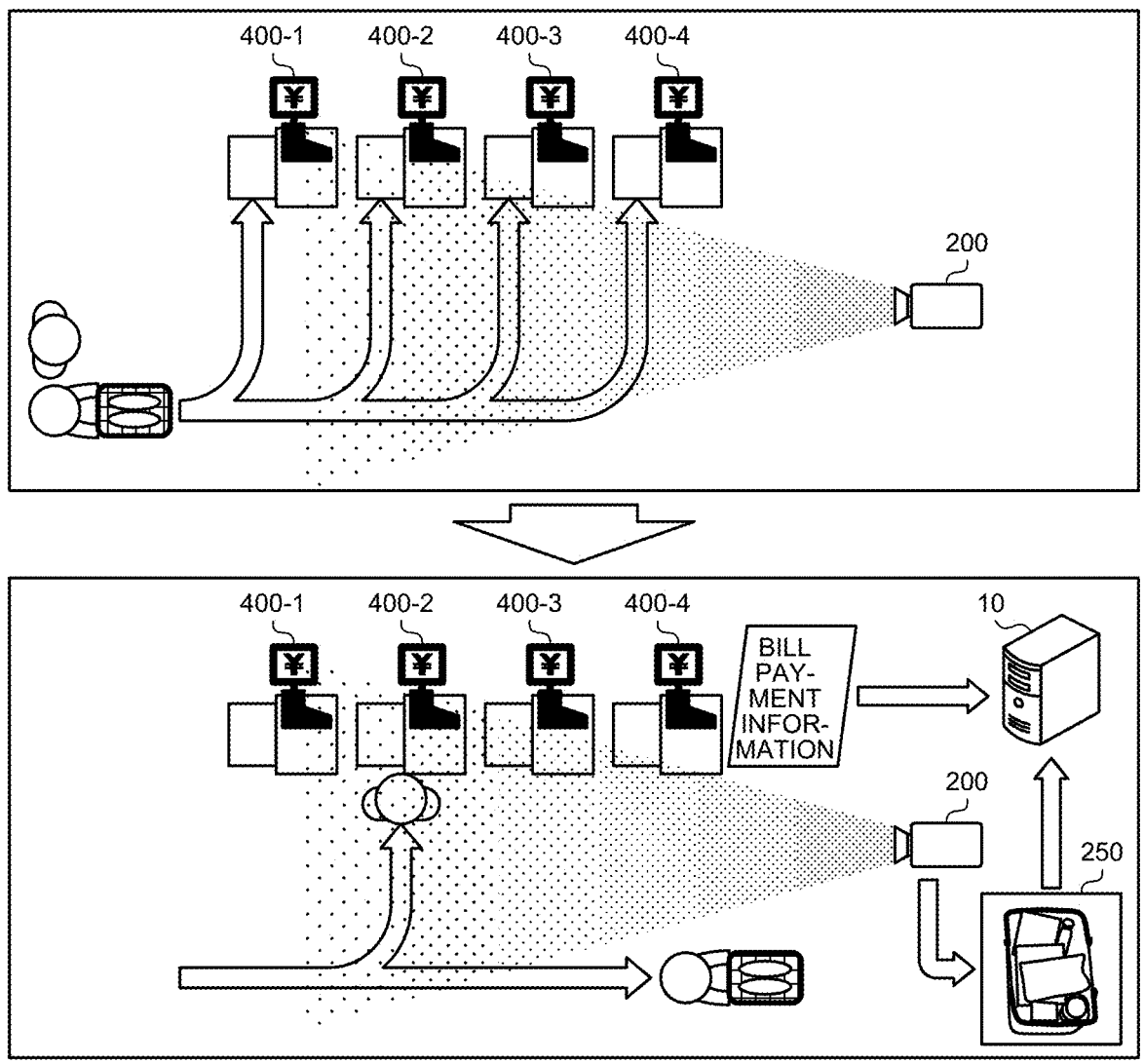
FIG. 6 is a diagram illustrating an example of a fraud detection process according to the first embodiment.

In the following, a fraud detection process performed by the fraud detection apparatus 10 functioning as an actor will be described with reference to FIGS. 6 to 9. FIG. 6 is a diagram illustrating an example of the fraud detection process according to the first embodiment. As illustrated in the upper side of FIG. 6, the inside of the store is captured by the camera device 200, and the fraud detection apparatus 10 specifies persons and a basket that is used by the persons from the captured image that has been captured by the camera device 200. Moreover, in the example illustrated in FIG. 6, only a single piece of the camera device 200 that captures a site in the vicinity of the self-service checkout counter area in which the bill payment terminal 400 is installed; however, the fraud detection apparatus 10 is able to specify persons and objects from the captured images captured by the camera devices 200 that are installed various positions in the store. A method of specifying persons or objects from a captured image will be described with reference to FIG. 7.

Figure 7:
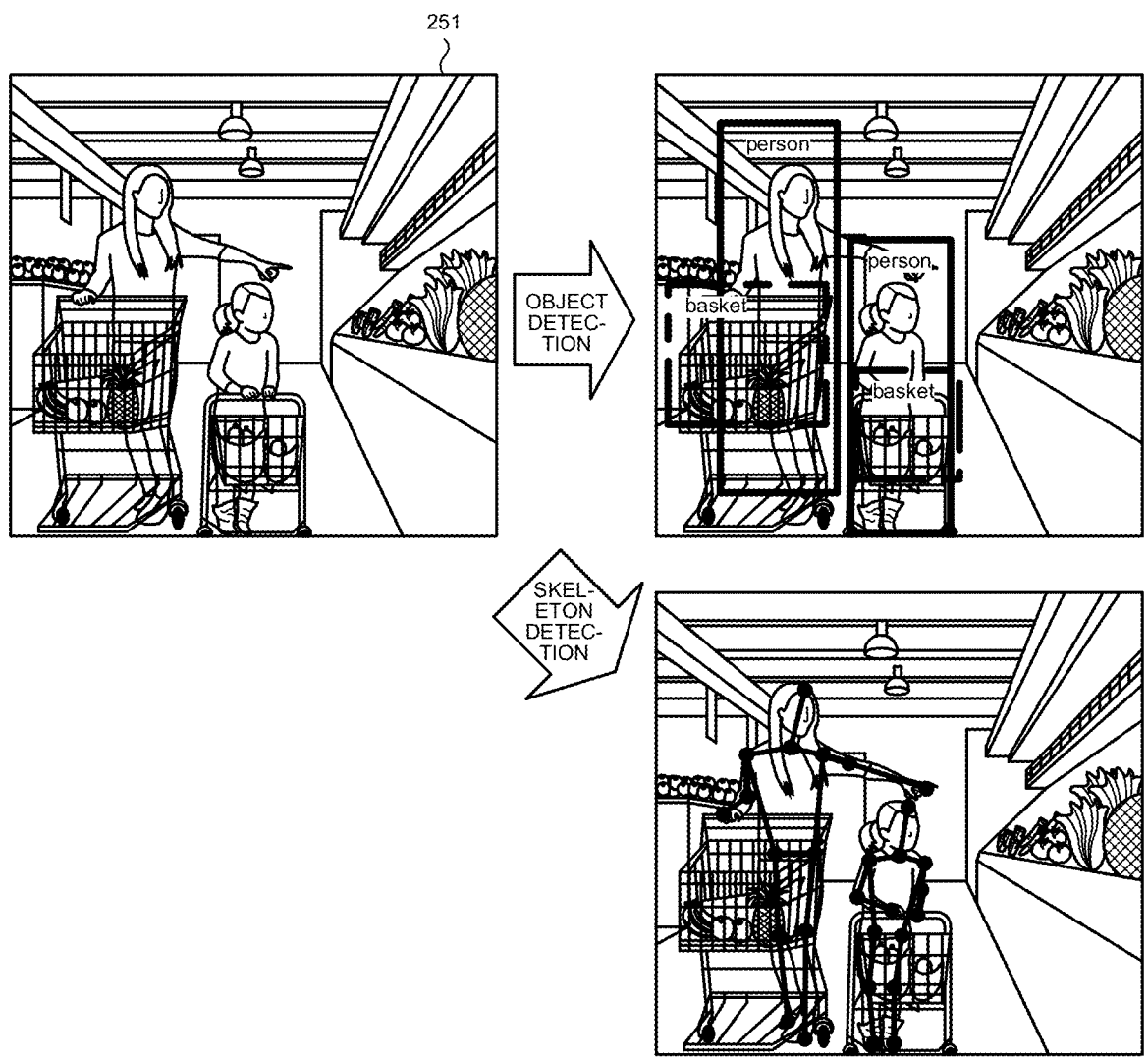
FIG. 7 is a diagram illustrating an example of object detection and skeleton detection according to the first embodiment.

FIG. 7 is a diagram illustrating an example of object detection and skeleton detection according to the first embodiment. As illustrated on the upper right part of FIG. 7, the fraud detection apparatus 10 detects and specifies persons and baskets from a captured image 251 by using, for example, an existing object detection algorithm. The existing object detection algorithm mentioned here is an object detection algorithm using, for example, deep training, such as Faster Convolutional Neural Network (R-CNN). Furthermore, the existing object detection algorithm may be an object detection algorithm, such as YOLO or Single Shot Multibox Detector (SSD).

Furthermore, other than the persons or the baskets, for example, commodity products, the user terminal 100, or clothes of a person may be detected from the captured image. As a result, the fraud detection apparatus 10 is able to detect a state in which, for example, a person does not perform self-scanning even though the person has the user terminal 100. Furthermore, the fraud detection apparatus 10 is able to exclude, for example, a person who does not have the user terminal 100 or a person who wears a uniform of a store clerk from the target of the fraud detection process. In this way, the fraud detection apparatus 10 is able to reduce the processing load by excluding the persons who do not need to be subjected to fraud detection from the processing target.

Furthermore, the fraud detection apparatus 10 is able to determine an age of the person specified from the captured image by using, for example, an existing algorithm, and specify a relationship, such as a parent and child relationship, between the persons.

Furthermore, as illustrated on the lower right part of FIG. 7, the fraud detection apparatus 10 may detect skeletons of the person specified from the captured image 251 by using, for example, an existing skeleton estimation algorithm. The existing skeleton estimation algorithm mentioned here is a skeleton estimation algorithm using, for example, deep training, such as Human Pose estimation.

Then, the fraud detection apparatus 10 may specify the motion of the person by using an existing pose estimation algorithm on the basis of the detected object or skeleton information. The existing pose estimation algorithm mentioned here is a pose estimation algorithm using deep training, such as DeepPose or OpenPose.

Figure 8:
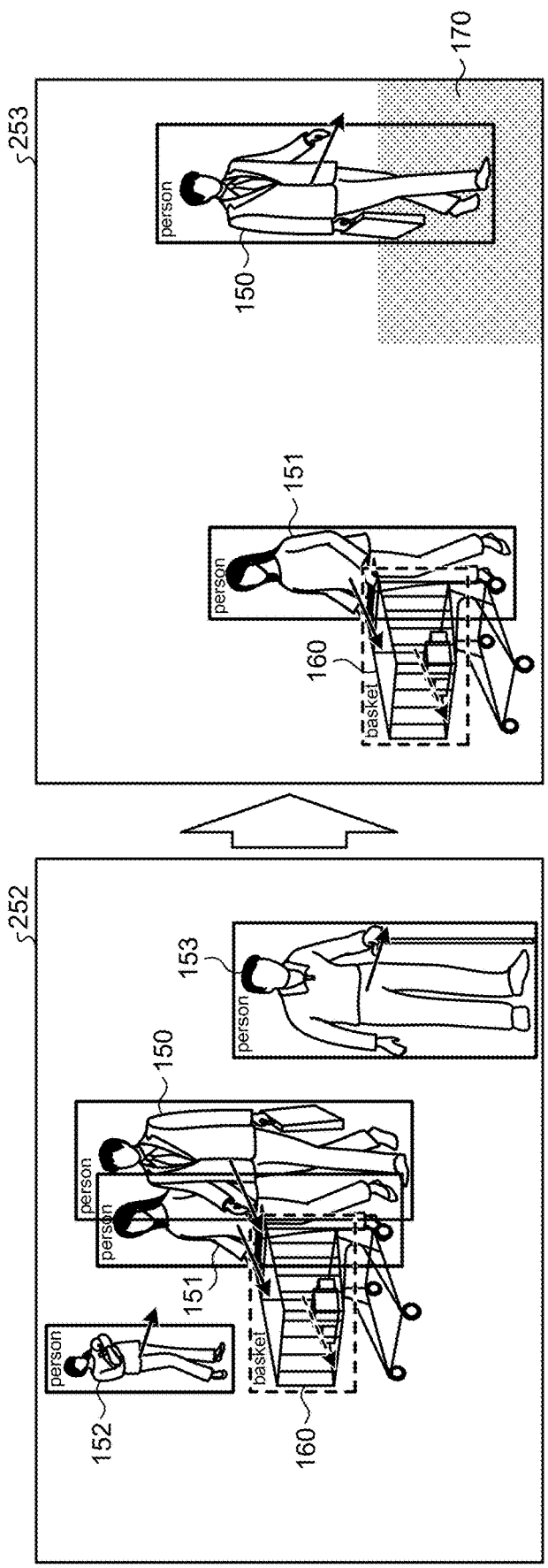
FIG. 8 is a diagram illustrating an example of specifying a group according to the first embodiment.

Furthermore, the fraud detection apparatus 10 specifies a group that is constituted of a plurality of persons on the basis of the relationship between the specified persons. FIG. 8 is a diagram illustrating an example of specifying of a group according to the first embodiment. As illustrated on the left side of FIG. 8, the fraud detection apparatus 10 specifies a group on the basis of the position and the movement vector of each of the bounding boxes of the associated persons or the basket specified from a captured image 252 of the inside of the store captured by the camera device 200.

For example, if each of the bounding boxes of the associated persons and the basket moves in the same direction in a predetermined time period while keeping a distance within a predetermined distance, the fraud detection apparatus 10 specifies that the persons and the basket are the same group. In the example illustrated in FIG. 8, it is determined that the bounding boxes of a person 150, a person 151, and a basket 160 are moving in the same direction in a predetermined time period while keeping the distance within the predetermined distance, so that it is determined that the group is the same group. In contrast, it is determined that each of a person 152 and a person 153 is a single customer who does not belong to the group. Moreover, a state in which the bounding boxes are moving in the same direction in the predetermined time period while keeping the distance within the predetermined distance is able to be determined from the position and the amount of movement of each of the bounding boxes that are specified from the consecutively respective captured images including, for example, the captured image 252. Furthermore, the same direction need not be completely the same direction but may be a direction within a predetermined range regarded as the same direction. Furthermore, in addition to the bounding boxes, it may be possible to specify a group between the persons by detecting the orientation of the faces of the persons or closeness of the persons' feet from, for example, the skeleton information on the persons specified from the captured image.

Then, the persons and the basket determined to belong to the same group are regarded to belong to the same group even if, as illustrated on the right side of FIG. 8, the persons are located at separate positions in a different captured image 253. Accordingly, for example, as illustrated on the right side of FIG. 8, even if the person 150 enters a region 170 of a self-service checkout counter area in the captured image 253 in order to pay a bill of the commodity products to be purchased, the person 151 and the basket 160 located at a position away from the region 170 are associated with the person 150. Moreover, the fraud detection apparatus 10 is able to specify the person who enters, for example, the region 170 of the self-service checkout counter area as the person who pays a bill of the commodity products. Furthermore, although not illustrated, the fraud detection apparatus 10 is able to specify, as a person who carries the basket in which the commodity products are contained, the person who enters a predetermined region that is included in a captured image and that indicates the area in which the commodity products are put into a bag.

Then, on the basis of the positional information on the person 150 and the bill payment terminal 400, the fraud detection apparatus 10 specifies the bill payment terminal 400 in which the person 150 pays a bill. Accordingly, the fraud detection apparatus 10 is able to further associate the bill payment terminal 400 in which the person 150 pays a bill or bill payment information that is related to the commodity products to be purchased and that have been input to the bill payment terminal 400 with the commodity products contained in the basket 160. In this way, finally, the person, the basket, the bill payment terminal 400, the bill payment information, the commodity products contained in the basket, and each of the captured images are associated with each other, so that, even if, for example, the commodity products are put into a bag and are accordingly separated from the basket, the fraud detection apparatus 10 is able to track the commodity products purchased by the person.

A description will be given here by referring back to FIG. 6. As illustrated on the lower side of FIG. 6, the bill payment information that is related to the commodity products to be purchased and that has been input to the bill payment terminal 400 and a captured image 250 that is captured by the camera device 200 are transmitted to the fraud detection apparatus 10. Then, as described above with reference to FIG. 8, the bill payment information and the basket that has been specified from the captured image are associated with each other, so that the fraud detection apparatus 10 is able to determine whether or not an unpaid commodity product is present on the basis of a difference between the number of commodity products that is contained in the basket and the number of paid commodity products that has been determined based on the bill payment information. Moreover, in the example illustrated in FIG. 6, the captured image 250 is an image in which only the basket has been captured, but may be an image in which a plurality of persons or baskets are captured. However, for example, it may be possible to install the camera device 200 such that the camera device 200 is able to capture an image of a basket from a position above a person's head and more clearly capture the content of the basket.

Figure 9:
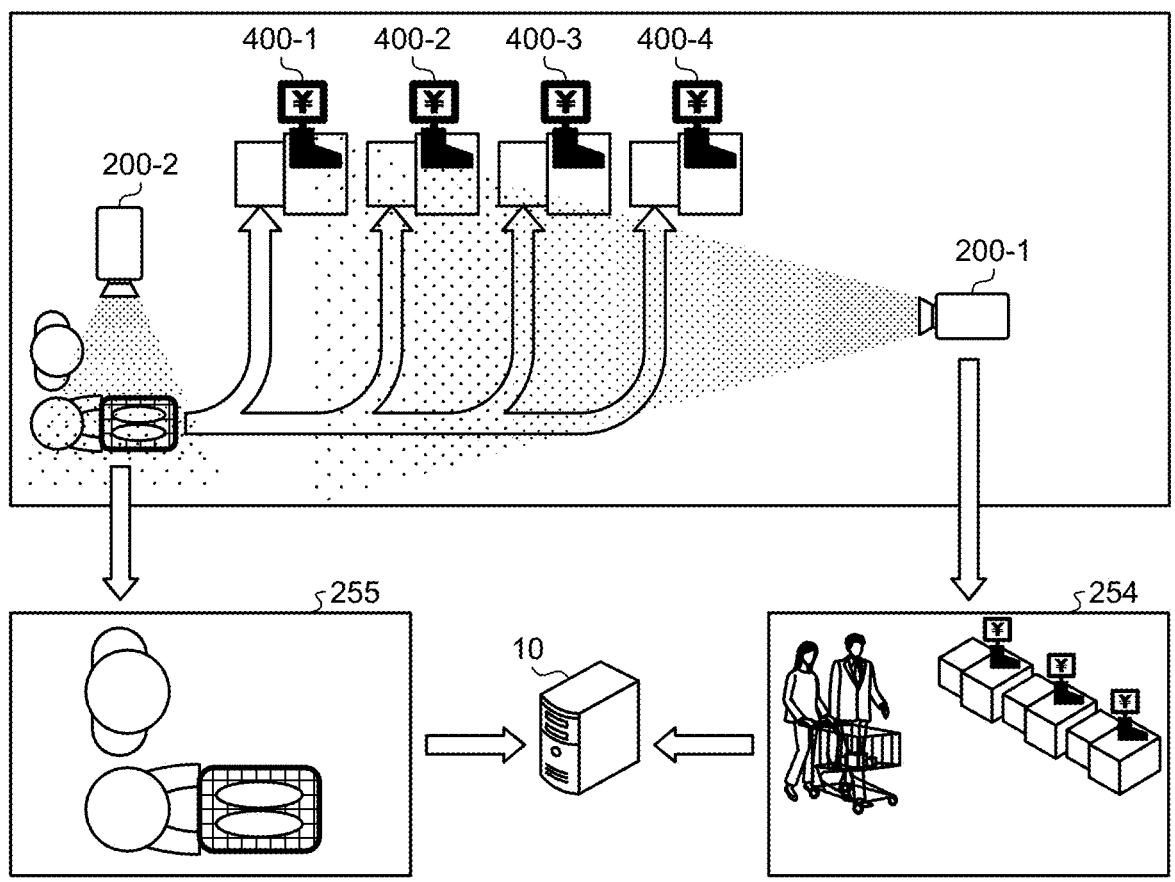
FIG. 9 is a diagram illustrating an example of a dedicated camera for capturing images of baskets according to the first embodiment.

FIG. 9 is a diagram illustrating an example of a dedicated camera for capturing a basket according to the first embodiment. As illustrated in FIG. 9, in addition to the camera device 200-1 that captures a site in the vicinity of the self-service checkout counter area in which the bill payment terminal 400 is installed, the camera device 200-2 dedicated for capturing a basket from a position above a person's head is installed. The images captured by the camera device 200-1 and the camera device 200-2 have an association relationship based on, for example, the coordinates on the image, and the association relationship is stored in the fraud detection apparatus 10. As a result, for example, if a person enters the coordinate region that is located on a captured image 254 captured by the camera device 200-1 and that indicates an image capturing range of the camera device 200-2, the fraud detection apparatus 10 performs control such that the camera device 200-2 captures an image of the basket from a position above a person's head. A captured image 255 captured by the camera device 200-2 is transmitted to the fraud detection apparatus 10. As a result, the camera device 200 is able to more clearly capture an image of the basket captured at the time at which, for example, a person enters the self-service checkout counter area in order to pay a bill, and thus, the fraud detection apparatus 10 is able to specify the basket from the image in which the basket has been captured.

In the following, an alert that is notified to the store clerk terminal 300 and that is sent when, for example, it is determined by the fraud detection apparatus 10 that an unpaid commodity product is present will be specifically described. FIG. 10 is a diagram illustrating an example of an alert notification according to the first embodiment. FIG. 10 is a diagram illustrating an example of an alert that is notified to the store clerk terminal 300 and that is displayed on a display unit, such as the store clerk terminal 300.

As illustrated in FIG. 10, the alert may include a bill payment information display unit 350 and a basket image display unit 351. On the bill payment information display unit 350, for example, a checkout counter No. that uniquely indicates the bill payment terminal 400 and the bill payment information on the paid commodity products are displayed. Furthermore, on the basket image display unit 351, for example, the captured image 255 in which the basket associated with the paid commodity products has been captured is displayed. Furthermore, on the basket image display unit 351, the amount of materials of the commodity products that have been estimated from the captured image 255 by the fraud detection apparatus 10 and that are contained in the basket may be displayed. Furthermore, on the display of the alert, for example, if the number of items of the paid commodity products indicated by the bill payment information is less than a threshold that is set to the estimated amount of materials, it is possible to display information indicating that a scan omission of a commodity product occurs. Moreover, the alert is not limited to a case in which the fraud detection apparatus 10 detects a scan omission of a commodity product, but may be notified to the store clerk terminal 300 in the case where, for example, a payment has been made by the bill payment terminal 400. As a result, the store clerk is able to visually check the bill payment information or the basket image displayed on the bill payment information display unit 350 or the basket image display unit 351, respectively, via the store clerk terminal 300 and detect a scan omission of a commodity product.

Flow of Process

Figure 11:
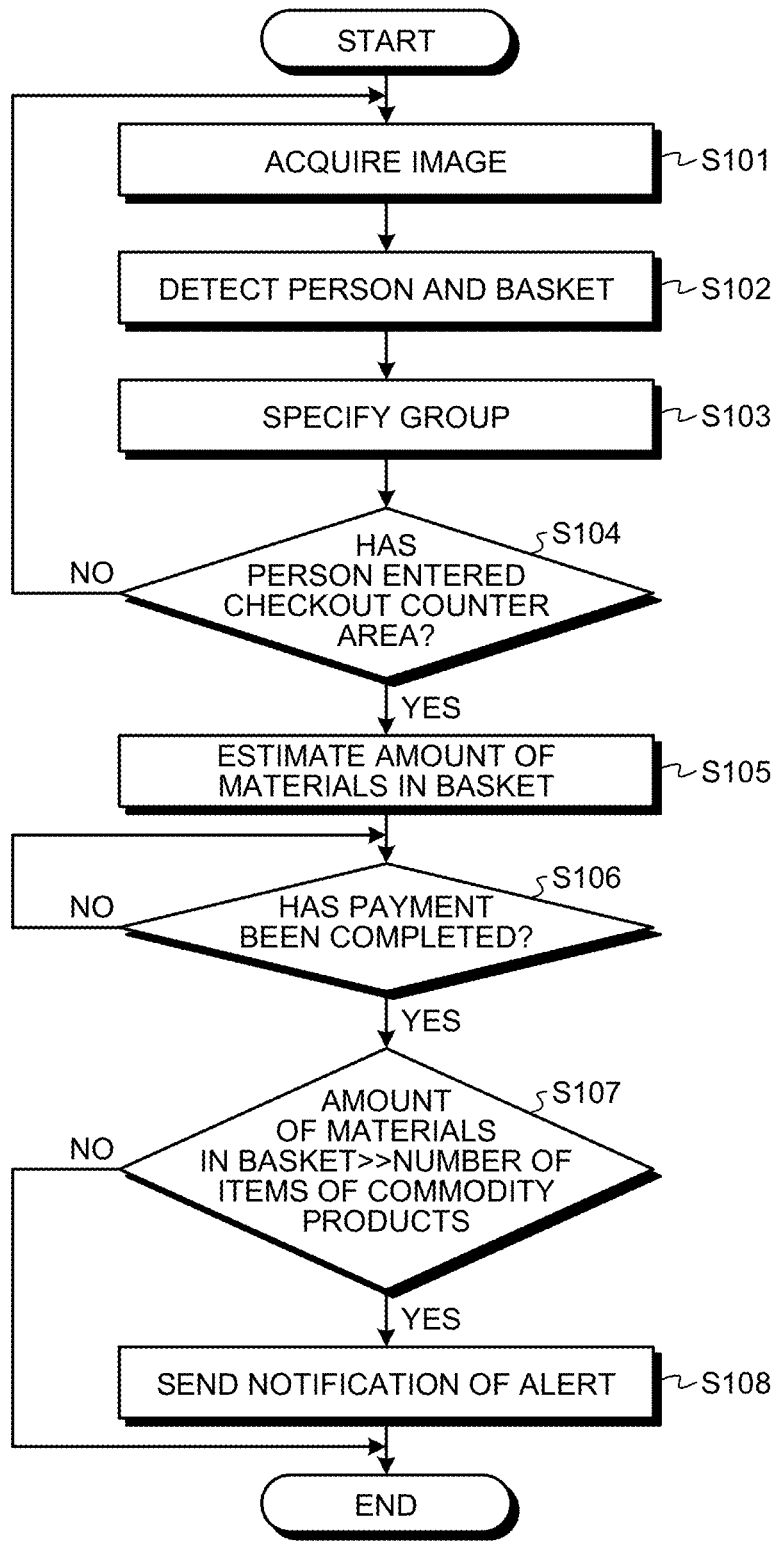
FIG. 11 is a flowchart illustrating the flow of the fraud detection process according to the first embodiment.

In the following, the flow of the fraud detection process performed by the fraud detection apparatus 10 will be described. FIG. 11 is a flowchart illustrating the flow of the fraud detection process according to the first embodiment. The fraud detection process illustrated in FIG. 11 may be performed, for example, at fixed intervals, or every time a captured image is received from the camera device 200.

First, as illustrated in FIG. 11, the fraud detection apparatus 10 acquires, from the image DB 31, a captured image of a predetermined image capturing range, such as the inside or the site of the store of the retail store, captured by the camera device 200 (Step S101). Moreover, in the fraud detection process illustrated in FIG. 11, in order to process the captured image captured by the camera device 200, in a precise sense, a monitoring video image in real time, the captured image is transmitted from the camera device 200 as needed, and is stored in the image DB 31.

Then, the fraud detection apparatus 10 detects, by using the existing object detection algorithm, persons and a shopping basket from the captured image acquired at Step S101 (Step S102).

Then, the fraud detection apparatus 10 specifies, on the basis of the position and the movement vector of each of the bounding boxes of the persons and the basket detected at Step S102, a group between persons and a group between the persons and the basket (Step S103).

Then, if the fraud detection apparatus 10 detects, from the captured image acquired at Step S101, that the person has entered the self-service checkout counter area (Yes at Step S104), the fraud detection apparatus 10 estimates the amount of materials of the commodity products that are associated with the person and that are contained in the basket (Step S105). In contrast, if it is not detected that the person enters the self-service checkout counter area (No at Step S104), the process is repeated from Step S101.

Then, the fraud detection apparatus 10 receives the bill payment information from the bill payment terminal 400 and determines whether or not a payment of the bill has been completed (Step S106). If the fraud detection apparatus 10 does not receive the bill payment information (No at Step S106), the fraud detection apparatus 10 waits to receive the bill payment information.

In contrast, if the bill payment information has been received and a payment has been completed (Yes at Step S106), the fraud detection apparatus 10 compares the amount of materials contained in the basket estimated at Step S105 to the number of items of the paid commodity products based on the bill payment information and determines whether or not a scan omission of a commodity product has occurred (Step S107).

Then, for example, if it is determined that the number of items of the paid commodity products is greater than or equal to the threshold that is set to the amount of materials contained in the basket and it is determined that a scan omission of a commodity product does not occur (No at Step S107), the fraud detection process illustrated in FIG. 11 is ended.

In contrast, for example, it is determined that the number of items of the paid commodity products is less than the threshold that is set to the amount of materials contained in the basket and it is determined that a scan omission of a commodity product occurs (Yes at Step S107), the fraud detection apparatus 10 notifies the store clerk terminal 300 of an alert (Step S108). After having performed the process at Step S108, the fraud detection process illustrated in FIG. 11 is ended.

Effects

As described above, the fraud detection apparatus 10 specifies, from a captured image, a person who visits a store and a basket that is used by the person, specifies a first group constituted of a plurality of persons visiting the store, specifies a first person who makes a payment of the commodity products from among the plurality of persons who belong to the first group, specifies a second person who carries the basket in which the commodity products are contained from among the plurality of persons belonging to the first group, and determines, when it is determined that the payment has been made by the first person, that the payment of the commodity products contained in the basket carried by the second person has been completed.

In this way, the fraud detection apparatus 10 associates each of the persons who visit the store, the group between the persons, the basket that is used by the group, and the commodity products contained in the basket. As a result, in a system in which customers perform commodity product scans by themselves, the fraud detection apparatus 10 is able to improve the accuracy of detecting a scan omission of a commodity product even when a person who pays a bill and a person who carries the shopping basket are different.

Furthermore, the process of specifying the first person performed by the fraud detection apparatus 10 includes a process of specifying the person as the first person when the person enters a first region in the image, and the process of specifying the second person includes a process of specifying the person as the second person when the person enters a second region in the image.

In this way, the fraud detection apparatus 10 is able to more accurately specify, between the persons belonging to the group, the first person who makes a payment of the commodity products and the second person who carries the basket in which the commodity products are contained. In addition, as a result, in a system in which customers perform commodity product scans by themselves, the fraud detection apparatus 10 is able to further improve the accuracy of detecting a scan omission of a commodity product even when the person who pays the bill and the person who carries the shopping basket are different.

Furthermore, the process of specifying the first person performed by the fraud detection apparatus 10 includes a process of specifying, on the basis of the positional information on the persons and the positional information on the bill payment terminal 400, the person who has made the payment at the bill payment terminal 400 as the first person, and the process of specifying the second person includes a process of specifying the person who carries the basket in which the commodity products are contained as the second person from among the plurality of persons who belong to the first group to which the first person belongs.

In this way, the fraud detection apparatus 10 is able to further accurately specify, between the persons belonging to the group, the first person who makes the payment of the commodity products and the second person who carries the basket in which the commodity products are contained. In addition, as a result, in a system in which customers perform commodity product scans by themselves, the fraud detection apparatus 10 is able to further improve the accuracy of detecting a scan omission of a commodity product even when the person who pays the bill and the person who carries the shopping basket are different.

Furthermore, the fraud detection apparatus 10 determines whether or not an unpaid commodity product is present on the basis of a difference between the number of commodity products that are input to the bill payment terminal 400 by the first person and the number of commodity products that are contained in the basket carried by the second person, and sends a notification of an alert when an unpaid commodity product is present.

As a result, in a system in which customers perform commodity product scans by themselves, the fraud detection apparatus 10 is able to send a notification to the store clerk when the scan omission of the commodity product has been detected.

Furthermore, the fraud detection apparatus 10 receives, from the bill payment terminal 400, bill payment information that is related to the commodity products and that has been input to the bill payment terminal 400 by the first person. Furthermore, the process of determining whether or not the unpaid commodity product is present performed by the fraud detection apparatus 10 includes a process of determining whether or not the unpaid commodity product is present on the basis of a difference between the number of paid items of the commodity products input to the bill payment terminal 400 based on the bill payment information and the number of commodity products that are contained in the basket carried by the second person.

As a result, in a system in which customers perform commodity product scans by themselves, the fraud detection apparatus 10 is able to further improve the accuracy of detecting a scan omission of a commodity product.

Furthermore, the process of receiving the bill payment information performed by the fraud detection apparatus 10 includes a process of receiving, from the bill payment terminal 400, the bill payment information on the commodity products registered via the user terminal 100 that is used to, by a customer by himself or herself, register the commodity products to be purchased.

As a result, in a system in which customers perform commodity product scans by themselves, the fraud detection apparatus 10 is able to further improve the accuracy of detecting a scan omission of a commodity product.

Furthermore, the process of determining whether or not the unpaid commodity product is present performed by the fraud detection apparatus 10 includes a process of cutting out, from the image, an image of the basket as a first partial image, estimating, based on the first partial image, a first amount of materials of the commodity products contained in the basket, and determining whether or not the unpaid commodity product is present on the basis of the first amount of materials and the number of commodity products that have been input to the bill payment terminal 400.

As a result, in a system in which customers perform commodity product scans by themselves, the fraud detection apparatus 10 is able to further improve the accuracy of detecting a scan omission of a commodity product.

Furthermore, the process of estimating the first the amount of materials performed by the fraud detection apparatus 10 includes a process of estimating the first amount of materials by inputting the first partial image to a machine training model that is generated by performing machine training by using the image of the basket as a feature amount and the amount of materials of the commodity products contained in the basket as a correct answer label.

As a result, in a system in which customers perform commodity product scans by themselves, the fraud detection apparatus 10 is able to further improve the accuracy of detecting a scan omission of a commodity product.

Furthermore, the process of specifying the first group performed by the fraud detection apparatus 10 includes a process of specifying the first group on the basis of a position and the movement vector of each of the bounding boxes of the plurality of persons included in the image.

As a result, in a system in which customers perform commodity product scans by themselves, the fraud detection apparatus 10 is able to further accurately specify the group between the persons and is able to further improve the accuracy of detecting a scan omission of a commodity product even when the person who pays the bill and the person who carries the shopping basket are different.

Furthermore, the process of sending the notification of the alert performed by the fraud detection apparatus 10 includes a process of notifying, as the alert, a store clerk terminal of an image of the commodity products contained in the basket included in the captured image and the bill payment information on the commodity products input to the bill payment terminal 400 by the first person.

As a result, in a system in which customers perform commodity product scans by themselves, the fraud detection apparatus 10 is able to notify the store clerk of further detailed information for detecting a scan omission of a commodity product.

System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Hardware

Figure 12:
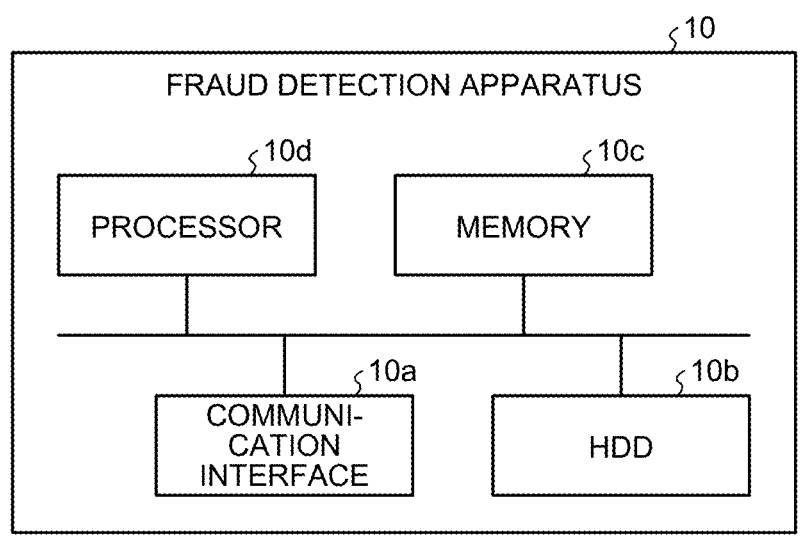
FIG. 12 is a diagram illustrating an example of a hardware configuration.

FIG. 12 is a diagram illustrating an example of a hardware configuration. As illustrated in FIG. 12, the fraud detection apparatus 10 includes a communication interface 10*a*, a hard disk drive (HDD) 10*b*, a memory 10*c*, and a processor 10*d*. Furthermore, each of the units illustrated in FIG. 12 is connected each other via a bus or the like. Moreover, FIG. 12 illustrates the hardware configuration of the fraud detection apparatus 10; however, the user terminal 100, the store clerk terminal 300, and the like may also have the same configuration as that of the fraud detection apparatus 10.

The communication interface 10*a* is a network interface card or the like and communicates with another server. The HDD 10*b* stores therein programs or the DB that operates the function illustrated in FIG. 4.

The processor 10*d* is a hardware circuit that operates the process that executes each of the functions described above in FIG. 4 or the like by reading the programs that execute the same process as that performed by each of the processing units illustrated in FIG. 4 from the HDD 10*b* or the like and loading the read programs in the memory 10*c*. In other words, the process executes the same function as that performed by each of the processing units included in the fraud detection apparatus 10. Specifically, the processor 10*d* reads, from the HDD 10*b* or the like, the programs having the same function as that performed by the specifying unit 41, the generating unit 42, the evaluating unit 43, the notifying unit 44, and the like. Then, the processor 10*d* executes the process for executing the same processes as those performed by the specifying unit 41 and the like.

In this way, the fraud detection apparatus 10 is operated as an information processing apparatus that executes a motion control process by reading and executing the programs that execute the same process as that performed by each of the processing units illustrated in FIG. 4. Furthermore, the fraud detection apparatus 10 can also implement the same function as that described above in the embodiment by reading the programs from a recording medium by a medium recording device and executing the read programs. Furthermore, the programs described in another embodiment are not limited to be executed by the fraud detection apparatus 10. For example, the present embodiment may also be similarly used in a case in which another computer or a server executes a program or in a case in which another computer and a server cooperatively execute the program with each other.

Furthermore, the programs that execute the same process as that performed by each of the processing units illustrated in FIG. 4 can be distributed via a network, such as the Internet. Furthermore, the programs can be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

According to an aspect of an embodiment, in a system in which customers perform commodity product scans by themselves, it is possible to improve the accuracy of detecting a scan omission of a commodity product.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
    specifying, by analyzing a plurality of images taken by one or more camera devices, a first image area which includes a person who visits a store and a second image area which includes a container containing commodity products;
    specifying, by analyzing the plurality of images, positional relationship between each of a plurality of persons belonging to a first group and a specific machine placed in the store;
    identifying, from among the plurality of persons belonging to the first group, a first person who use the specific machine based on the positional relationship;
    specifying, by analyzing the plurality of images, a second person who carries the container in which the commodity products are contained from among the plurality of persons belonging to the first group;
    when receiving an issued certificate related to the commodity products from the specific machine which the first person used, performing authentication processing of the commodity products contained in the container carried by the second person has been completed by using the issued certificate;
    determining whether or not an unpaid commodity product is present based on a difference between the number of the commodity products that are input to the specific machine by the first person and the number of the commodity products that are contained in the container carried by the second person; and
    in response to determining that the unpaid commodity product is present, sending a notification of an alert,
    wherein specifying the container in the second image area from an image taken by a camera device of the one or more camera devices that captures an image from above the second person's head.

2. The non-transitory computer-readable recording medium having stored therein according to claim 1, wherein the process further comprises, receiving, from the specific machine, issued certificate on the commodity products input to the specific machine by the first person, wherein
    the determining whether or not the unpaid product is present includes determining whether or not the unpaid commodity product is present based on a difference between the number of paid items of the commodity products input to the specific machine based on the issued certificate and the number of the commodity products contained in the container carried by the second person.

3. The non-transitory computer-readable recording medium having stored therein according to claim 2, wherein the receiving the issued certificate includes receiving, from the specific machine, the issued certificate on the commodity products registered via a user terminal that is used to register, by a customer by himself or herself, the commodity products to be purchased.

4. The non-transitory computer-readable recording medium having stored therein according to claim 1, wherein
    determining whether or not the unpaid commodity product is present includes
        cutting out, from the image, an image of the container as a first partial image,
        estimating, based on the first partial image, a first amount of materials of the commodity products contained in the container, and
        determining whether or not the unpaid commodity product is present based on the first amount of materials and the number of the commodity products input to the specific machine.

5. The non-transitory computer-readable recording medium having stored therein according to claim 4, wherein the estimating the first amount of materials includes estimating the first amount of materials by inputting the first partial image to a machine training model that is generated by performing machine training by using the image of the container as a feature amount and the amount of materials of the commodity products contained in the container as a correct answer label.

6. The non-transitory computer-readable recording medium having stored therein according to claim 1, wherein the specifying the first group includes specifying the first group based on a position and a movement vector of each of bounding boxes of the plurality of persons included in the image.

7. The non-transitory computer-readable recording medium having stored therein according to claim 1, wherein the sending the notification of the alert includes notifying, as the alert, a store clerk terminal of an image of the commodity products contained in the container included in the captured image and the issued certificate on the commodity products input to the specific machine by the first person.

8. An information processing method executed by a computer, the method comprising:
specifying, by analyzing a plurality of images taken by one or more camera devices, a first image area which includes a person who visits a store and a second image area which includes a container containing commodity products;
specifying, by analyzing the plurality of images, positional relationship between each of a plurality of persons belonging to a first group and a specific machine placed in the store;
identifying, from among the plurality of persons belonging to the first group, a first person who use the specific machine based on the positional relationship;
specifying, by analyzing the plurality of images, a second person who carries the container in which the commodity products are contained from among the plurality of persons belonging to the first group;
when receiving an issued certificate related to the commodity products from the specific machine which the first person used, performing authentication processing of the commodity products contained in the container carried by the second person has been completed by using the issued certificate;
determining whether or not an unpaid commodity product is present based on a difference between the number of the commodity products that are input to the specific machine by the first person and the number of the commodity products that are contained in the container carried by the second person; and
in response to determining that the unpaid commodity product is present sending a notification of an alert,
wherein specifying the container in the second image area from an image taken by a camera device of the one or more camera devices that captures an image from above the second person's head.

9. The information processing method to claim 8, further comprising:
determining whether or not the unpaid commodity product is present includes
cutting out, from the image, an image of the container as a first partial image,
estimating, based on the first partial image, a first amount of materials of the commodity products contained in the container, and
determining whether or not the unpaid commodity product is present based on the first amount of materials and the number of the commodity products input to the specific machine.

10. The information processing method according to claim 9, wherein the estimating the first amount of materials includes estimating the first amount of materials by inputting the first partial image to a machine training model that is generated by performing machine training by using the image of the container as a feature amount and the amount of materials of the commodity products contained in the container as a correct answer label.

11. The information processing method according to claim 8, wherein the specifying the first group includes specifying the first group based on a position and a movement vector of each of bounding boxes of the plurality of persons included in the image.

12. The information processing method according to claim 8, further comprising:

receiving, from the specific machine, issued certificate on the commodity products input to the specific machine by the first person, wherein
the determining whether or not the unpaid product is present includes determining whether or not the unpaid commodity product is present based on a difference between the number of paid items of the commodity products input to the specific machine based on the issued certificate and the number of the commodity products contained in the container carried by the second person.

13. The information processing method according to claim 12, wherein the receiving the issued certificate includes receiving, from the specific machine, the issued certificate on the commodity products registered via a user terminal that is used to register, by a customer by himself or herself, the commodity products to be purchased.

14. An information processing apparatus, comprising:
a memory; and
a processor coupled to the memory and the processor configured to:
specify, by analyzing a plurality of images taken by one or more camera devices, a first image area which includes a person who visits a store and a second image area which includes a container containing commodity products;
specify, by analyzing the plurality of images, positional relationship between each of a plurality of persons belonging to a first group and a specific machine placed in the store;
identify, from among the plurality of persons belonging to the first group, a first person who use the specific machine based on the positional relationship;
specify, by analyzing the plurality of images, a second person who carries the container in which the commodity products are contained from among the plurality of persons belonging to the first group;
when receiving an issued certificate related to the commodity products from the specific machine which the first person used, perform authentication processing of the commodity products contained in the container carried by the second person has been completed by using the issued certificate;
determine whether or not an unpaid commodity product is present based on a difference between the number of the commodity products that are input to the specific machine by the first person and the number of the commodity products that are contained in the container carried by the second person; and
in response to determining that the unpaid commodity product is present send a notification of an alert,
wherein the processor is configured to specify the container in the second image area from an image taken by a camera device of the one or more camera devices that captures an image from above the second person's head.

15. The information processing apparatus according to claim 14, wherein the processor is further configured to
determine whether or not the unpaid commodity product is present includes
cut out, from the image, an image of the container as a first partial image,
estimate, based on the first partial image, a first amount of materials of the commodity products contained in the container, and determine whether or not the unpaid commodity product is present based on the first amount of materials and the number of the commodity products input to the specific machine.

16. The information processing apparatus according to claim 15, wherein the processor is configured to estimate the first amount of materials by estimating the first amount of materials by inputting the first partial image to a machine training model that is generated by performing machine training by using the image of the container as a feature amount and the amount of materials of the commodity products contained in the container as a correct answer label.

17. The information processing apparatus according to claim 14, wherein the processor is configured to specify the first group by specifying the first group based on a position and a movement vector of each of bounding boxes of the plurality of persons included in the image.

* * * * *